US011382035B2

United States Patent
Kwon et al.

(10) Patent No.: US 11,382,035 B2
(45) Date of Patent: Jul. 5, 2022

(54) TARGET WAKE TIME NEGOTIATION IN A MULTI-LINK WIRELESS LAN SYSTEM

(71) Applicant: NXP USA, INC., Austin, TX (US)

(72) Inventors: Young Hoon Kwon, Laguna Niguel, CA (US); Liwen Chu, San Ramon, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/095,401

(22) Filed: Nov. 11, 2020

(65) Prior Publication Data

US 2021/0144637 A1    May 13, 2021

Related U.S. Application Data

(60) Provisional application No. 63/069,800, filed on Aug. 25, 2020, provisional application No. 62/933,868, filed on Nov. 11, 2019.

(51) Int. Cl.
*H04W 52/02* (2009.01)
*H04L 1/16* (2006.01)
*H04W 80/02* (2009.01)
*H04W 84/12* (2009.01)

(52) U.S. Cl.
CPC ....... *H04W 52/0216* (2013.01); *H04L 1/1614* (2013.01); *H04W 80/02* (2013.01); *H04W 84/12* (2013.01)

(58) Field of Classification Search
CPC . H04W 52/0216; H04W 80/02; H04W 84/12; H04L 1/1614; Y02D 30/70
See application file for complete search history.

(56) References Cited

U.S. PATENT DOCUMENTS

| 10,153,857 | B1 * | 12/2018 | Chu | H04L 5/0091 |
| 2016/0219522 | A1 * | 7/2016 | Asterjadhi | H04W 28/0221 |
| 2019/0246354 | A1 * | 8/2019 | Huang | H04W 52/0216 |

* cited by examiner

*Primary Examiner* — Mohammad S Anwar (57) ABSTRACT

Aspects of the present disclosure involve negotiating a TWT agreement by communicating which links, of a multi-link system as may be used in WiFi communications, are to be used for negotiating the TWT agreement. This communication may be accomplished, for example, by using fields of the MAC header, individual TWT parameter set, or broadcast TWT parameter set.

21 Claims, 6 Drawing Sheets

FIG. 3
Individual TWT Parameter Set field format

TARGET WAKE TIME NEGOTIATION IN A MULTI-LINK WIRELESS LAN SYSTEM

OVERVIEW

Aspects of various embodiments are directed to protocols useful for wireless local area network (WLAN) Wi-Fi computer communications at various frequencies, and in particular negotiations involving wake times (e.g., Target Wake Time or TWT) which may be used in multi-link system implementations of wireless systems to help reduce both contention between clients and the amount of time a client in power save mode is to be awake.

During the standardization of IEEE 802.11 TGbe, the concept of TWT has been extended to the multi-link operation. Target wake times (TWTs) allow stations (STAs) to manage activity in the basic service set (BSS) by scheduling STAs to operate at different times in order to minimize contention and to reduce the required amount of time that a STA utilizing a power management mode needs to be awake. However, as the current TWT protocol is based on per-link operation, the current TWT protocol needs to be modified to be used in multi-link operation. In one such example involving a current TWT agreement, the TWT SP (service period) of a broadcast TWT may be uniquely identified by the broadcast TWT ID, MAC address of TWT scheduling AP tuple and the TWT SP of an individual TWT is uniquely identified by the TWT flow identifier, MAC address of TWT requesting STA, MAC address of TWT responding STA triple. However, when a TWT agreement is made on multiple links, there are more than one MAC address of TWT requesting STA, TWT responding STA, TWT scheduling access point (AP).

These and other matters have presented challenges to efficiencies of TWT negotiations in multi-link system implementations, for a variety of applications.

SUMMARY

Various example embodiments are directed to issues such as those addressed above and/or others which may become apparent from the following disclosure concerning efficient operation of multi-link devices (MLD) when negotiating Target Wake Time (TWT) and particularly in but not necessarily limited to IEEE 802.11-compliant systems. As one additional issue for example, backwards compatibility with known IEEE 802.11 systems is desired and realized in connection with certain example embodiments of the present disclosure.

In certain example embodiments, aspects of the present disclosure involve negotiating a TWT agreement by communicating which links, of a multi-link system, will be used to negotiate the TWT agreement. This communication may be accomplished by using, but not limited to, fields of the MAC header, Individual TWT Parameter Set, or Broadcast TWT Parameter Set.

In a more specific example embodiment, a system using (IEEE 802.11) wireless communication in accordance with a standard that specifies local area network (LAN) protocols, media access control (MAC), and physical layer (PHY) protocols for implementing wireless local area network (WLAN) Wi-Fi computer communication is configured to negotiate a TWT agreement. This agreement may be achieved by using or carrying information on which links the TWT agreement will be set up in a frame for the negotiation of the TWT agreement.

In another specific example embodiment, the management frame for the TWT, for at least one of control process (setup, teardown, suspend, resume), includes a MAC header. Also, at least one field of the MAC header indicates the links to which the TWT negotiation is applied.

In other specific example embodiments, in order to facilitate negotiation of the TWT agreement on a multi-link system, methods may include modifications to the TWT element format to allow for the inclusion of the multi-link indication.

In another method-type example, the present disclosure is directed to a method for a first MLD (multi-link device) to setup a first TWT agreement with a second MLD on a set of links. The method comprises: transmitting, by the first MLD, a first request frame to the second MLD, wherein the first request frame includes a first subfield set to a value indicating that the first frame requests a first TWT agreement; receiving, by the first MLD, a first response frame from the second MLD, wherein the first response frame includes the first subfield set to a value indicating that the first TWT agreement as requested is accepted and includes a first identifier to identify the first TWT agreement; and identifying, by the first MLD, the first TWT agreement uniquely by the first identifier, a MLD MAC address of the first MLD, and MLD MAC address of the second MLD.

Other example embodiments are related to one of more of the above aspects (e.g., involving a step of negotiating a TWT agreement by communicating which links, of a multi-link system, will be used to negotiate the TWT agreement) and also other specific aspects according to the present disclosure. Such other specific aspects include one or more of the following example embodiments involving: alternative methods in which a multi-link TWT agreement is identified; a tearing down operation of a multi-link TWT; operation of a multi-link TWT that is a Trigger-enabled TWT; operation of a multi-link TWT that is an unannounced TWT; switching from per-link TWT agreement to per-MLD TWT agreement; explicit indication of link suspension and/or resumption; and implicit indication of link suspension and/or resumption. Specific examples in connection with these alternative methods are provided under another heading.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods such as IEEE 802.11 systems requiring high data rates and low latency. In certain implementations, aspects of the present disclosure have been shown to be beneficial when used in the context of Wi-Fi hotspots or V2X (vehicle-to-everything) systems. In some embodiments, multi-link operation may allow for the required high levels of throughput and low latency. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In specific examples according to the present disclosure, embodiments involve negotiating a Target Wake Time (TWT) agreement. If the TWT agreement is negotiated between two stations which are members of multi-link devices (MLDs) wherein these MLDs are operating on more than one link, negotiating a TWT agreement involves setting up TWT sessions on one or more links. This may involve the carrying of information, in a frame, which describes on which links the TWT agreement will be set up. This may be used, for example, in wireless communication systems, using its applicable standards for LAN (local area network), MAC (media access control), and PHY (physical layer) protocols. This example WLAN (wireless local area network) system may use frequency bands of multiple Gigahertz.

In other specific examples according to the present disclosure, embodiments involve a method in which the management frame for the TWT involves use of a MAC header for at least one of the control processes (setup, teardown, suspend, resume). This method may include a MAC header in which at least one field of the MAC header indicates which links may use the TWT negotiation. In a specific example of the MAC header being used to indicate which links are applied to the TWT agreement, the A-Control (a variant of the HT Control field) field may include link information. This link information indicates which links are to applied to the TWT agreement.

Other specific examples in the instant disclosure may involve modifications to the TWT element format to include a multi-link indication, and the TWT agreement may include using an individual TWT parameter set information field which includes a link bitmap to indicate to which link or links the TWT agreement may be applied.

Figure 1A:
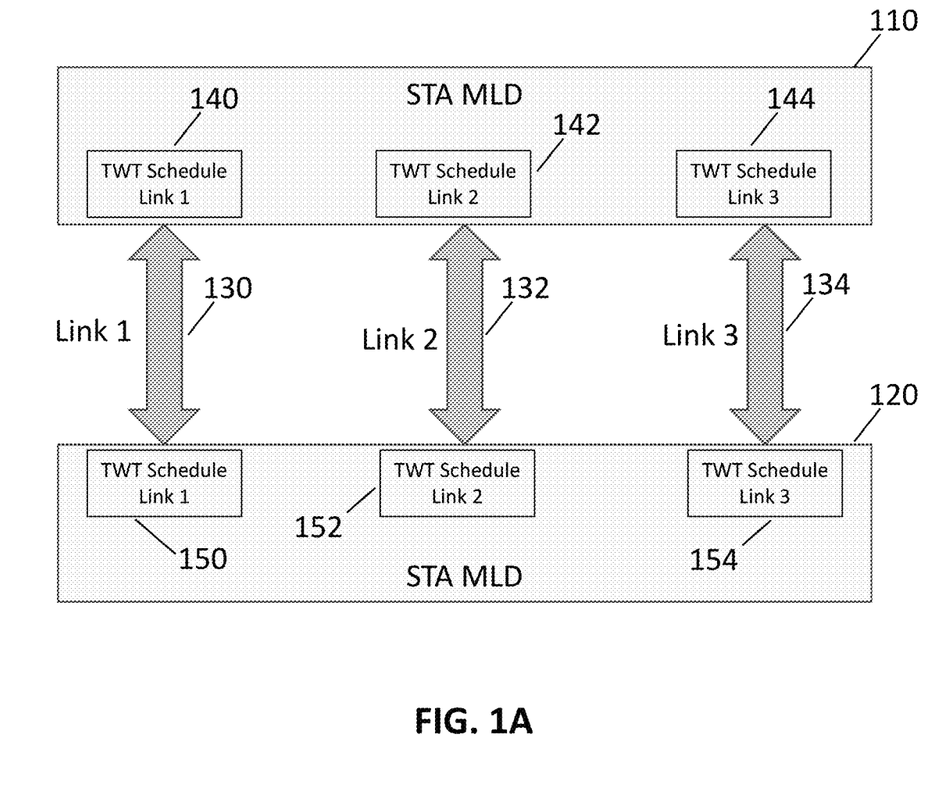
FIG. 1A is a system-level diagram illustrating an example of a wireless multi-link communications system negotiating a Target Wake Time (TWT) on which links will be used for negotiating the TWT agreement, in accordance with the present disclosure.

Now turning to the drawing and relating to the above-disclosed aspects and embodiments, FIG. 1A illustrates an example of a wireless communications system configured to operate in a multi-link device (MLD) manner. In this example, two communication devices 110 and 120 are illustrated with data communications between them taking place over three links 130, 132, and 134. The TWT agreements are negotiated in one or more frames and the TWT agreements will carry information on the TWT schedule (140, 142, 144, 150, 152, 154) for each of the links.

Figure 1B:
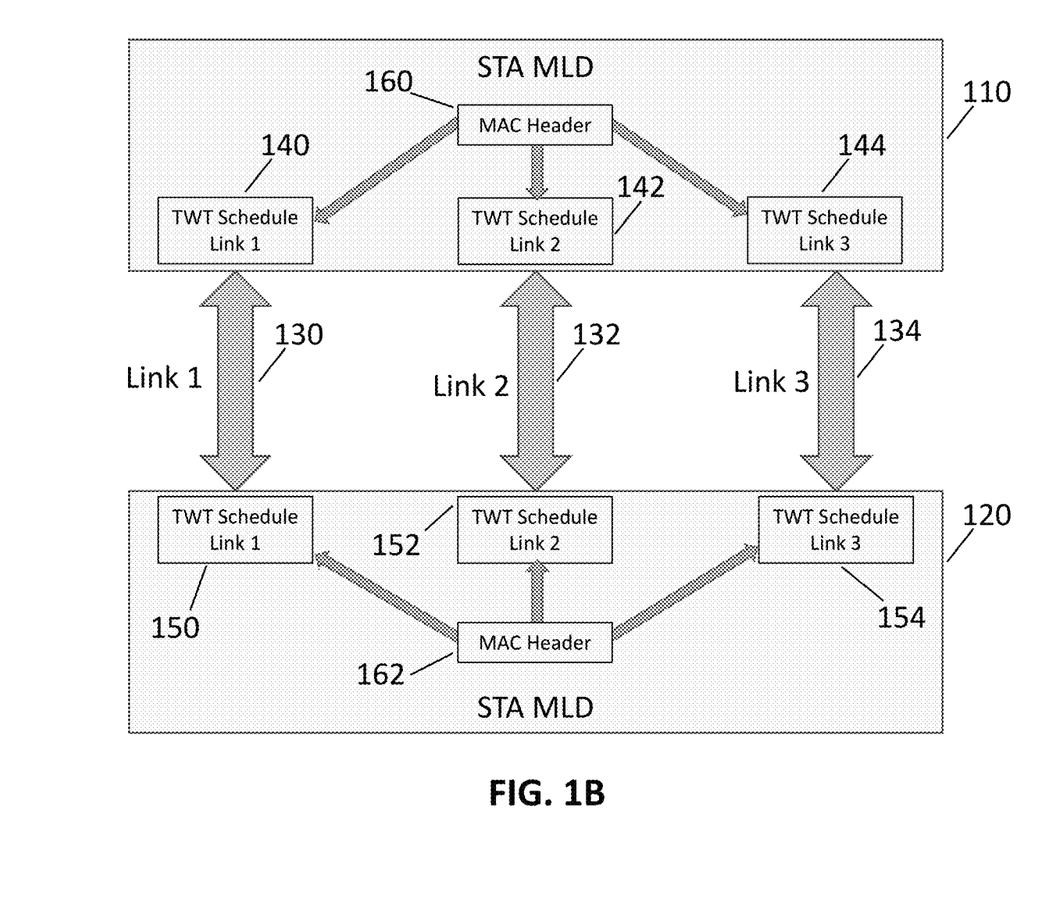
FIG. 1B is a system-level diagram illustrating an example of a wireless multi-link communications system in which the MAC header carries information on which links the TWT agreement is applied, in accordance with the present disclosure.

FIG. 1B illustrates an example of a wireless communications system configured to operate in a multi-link device (MLD) manner. In this example, two communication devices 110 and 120 are illustrated with data communications between them taking place over three links 130, 132, and 134. The TWT agreements are negotiated in one or more frames and the TWT agreements will carry information on the TWT schedule (140, 142, 144, 150, 152, 154) for each of the links. In this example the TWT negotiation information is communicated in one or more fields of the MAC headers (160, 162) of the one or more frames. Building on the system of FIG. 1B but not specifically shown therein, in connection with certain more specific embodiments some information on the TWT negotiation information may be delivered using MAC header parts and in some instances with not all the TWT negotiation information being delivered using MAC header parts only (e.g., frame bodies of the one or more frames may be used to deliver the other part(s) of the TWT negotiation information).

Figure 1C:
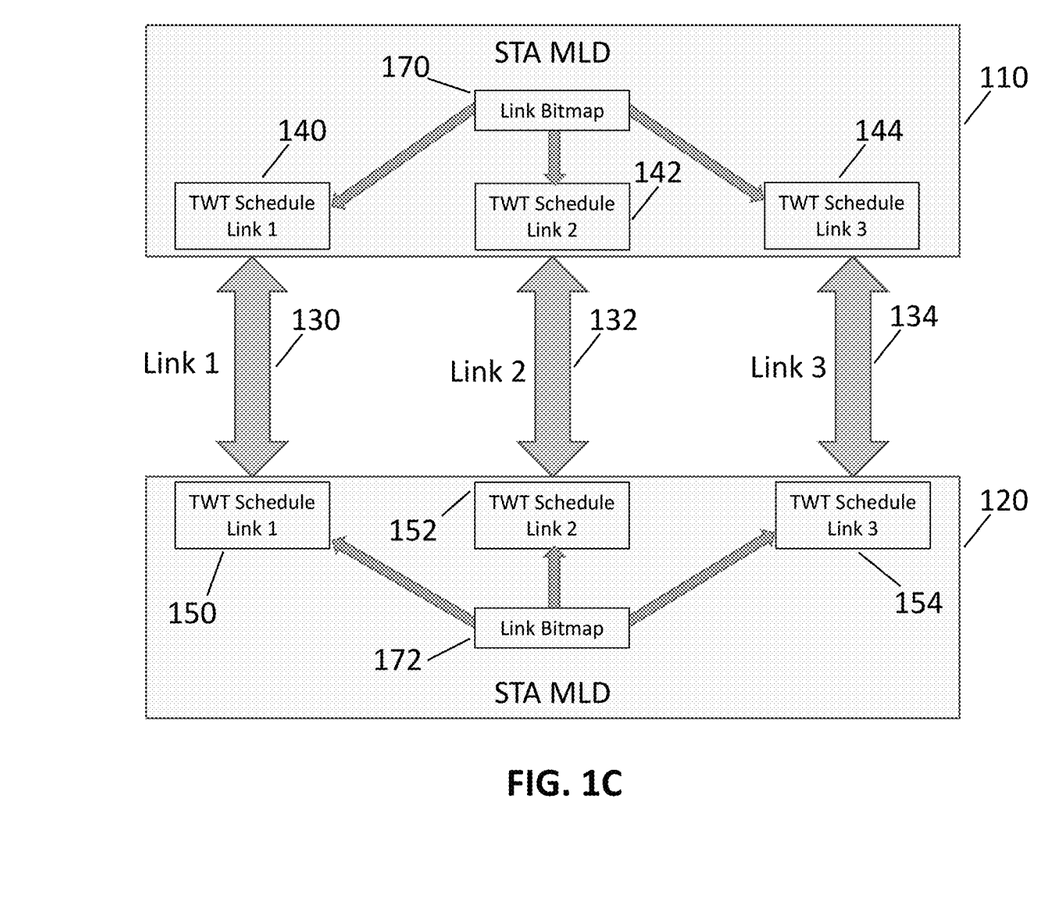
FIG. 1C is a system-level diagram illustrating an example of a wireless multi-link communications system in which a link bitmap carries information on which links the TWT agreement is applied, in accordance with the present disclosure.

FIG. 1C illustrates an example of a wireless communications system configured to operate in a multi-link device (MLD) manner. In this example, two communication devices 110 and 120 are illustrated with data communications between them taking place over three links 130, 132, and 134. The TWT agreements are negotiated in one or more frames and the TWT agreements will carry information on the TWT schedule (140, 142, 144, 150, 152, 154) for each of the links. In this example the TWT negotiation information may be communicated at least in part using a link bitmap (170, 172) field of either the Broadcast TWT Parameter Set or the Individual TWT Parameter Set. In certain more specific examples, the link bitmap is used only to indicate which links are involved for the TWT negotiation, and frame bodies of the one or more frames are used to deliver other part(s) of the TWT negotiation information.

Figure 2A:
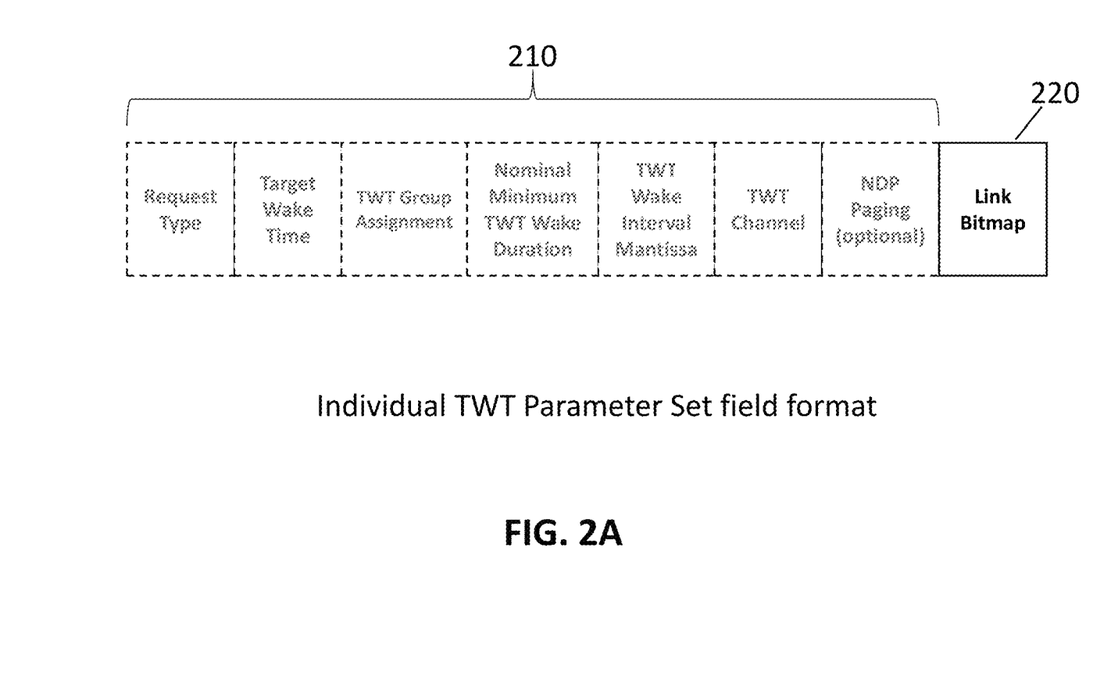
FIG. 2A is a diagram illustrating an Individual TWT Parameter Set field format with a link bitmap modification, in accordance with the present disclosure.

FIG. 2A illustrates a method in which the standard Individual TWT Parameter Set 210 is modified to include a multi-link indication field. This included field is in the form of a link bitmap 220 which may indicate which links are to be applied to the TWT agreement. The relative position of the link bitmap 220 within the Individual TWT Parameter Set 210 is an example and the link bitmap 220 may be located in alternate positions.

Figure 2B:
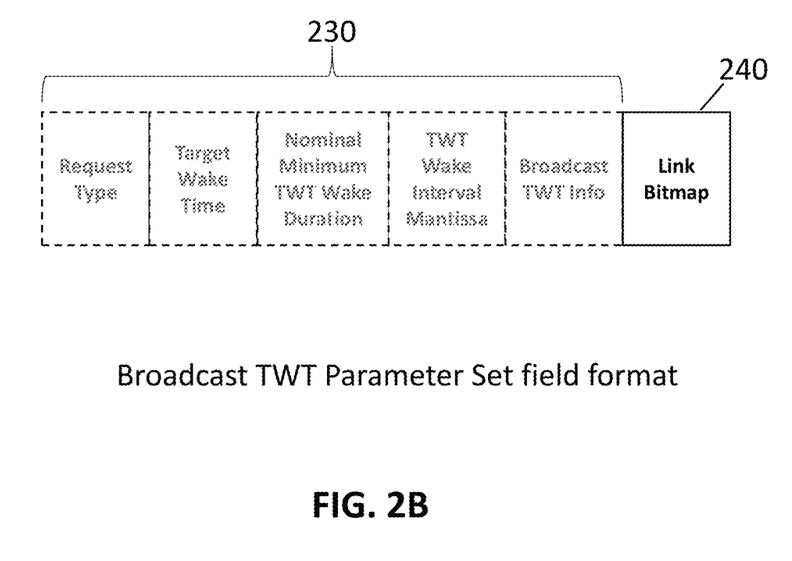
FIG. 2B is a diagram illustrating a Broadcast TWT Parameter Set field format with a link bitmap modification, in accordance with the present disclosure.

For broadcast operations, an example embodiment of modification of the Broadcast TWT Parameter Set fields is shown in FIG. 2B. The standard TWT Parameter Set 230 is modified by the addition of the link bitmap 240, which may indicate which links are to be applied to the TWT agreement. The relative position of the link bitmap 240 within the Broadcast TWT Parameter Set 230 is an example and the link bitmap 240 may be located in alternate positions.

The added link bitmap of FIGS. 2A and 2B may be used to indicate which links are considered for the TWT negotiation. Other parameters such as Timing Synchronization Function (TSF) value (which may be indicated in another part of the frame, or even in another frame) on a link may be applied to all the links shown in the link bitmap. In this regard, the TSF value is associated with the access point (AP) corresponding to the AP MLD (multi-link device) of the indicated link. This information may then be applied to all links.

Figure 3:
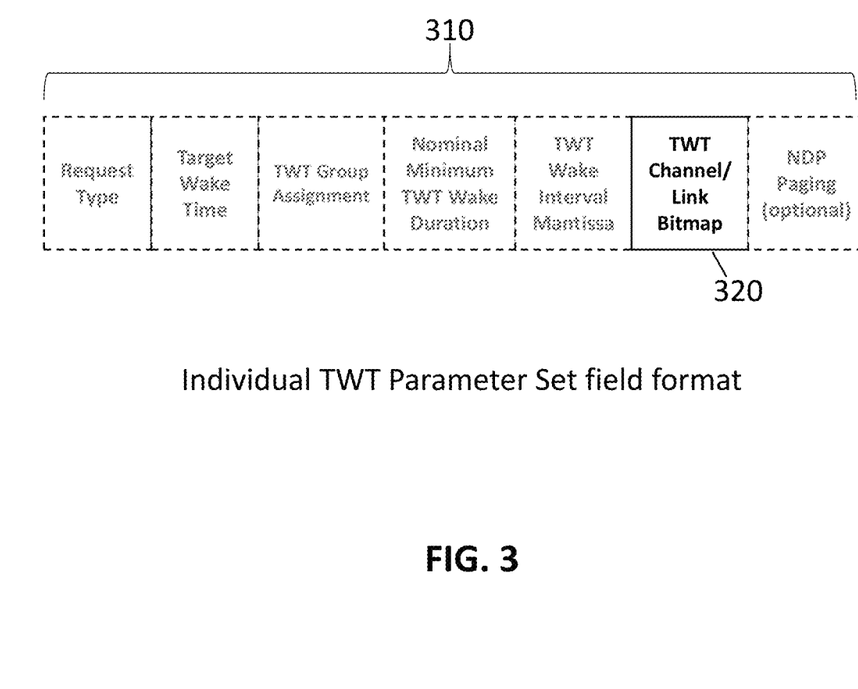
FIG. 3 is a diagram illustrating an Individual TWT Parameter Set field format with a link bitmap reusing the TWT Channel field, in accordance with the present disclosure.

FIG. 3 illustrates a method in which the standard Individual TWT Parameter Set 310 is used to include a multi-link indication field. In this example the link bitmap may reuse the TWT Channel field 320 of the Individual TWT Parameter Set 310. This field is in the form of a link bitmap 320 which may indicate which links are to be applied to the TWT agreement.

Related specific examples, also according to the present disclosure, may involve a multi-link TWT agreement that is made based on the information that indicates on which set of links the multi-link TWT agreement is to be set. Also, a set of parameters shown in the TWT element may be applied to each link that is indicated in such information.

In other specific examples according to the present disclosure, embodiments involve a method using one TWT Flow Identifier subfield (or one Broadcast TWT ID subfield) . In this example the above subfield may be used for one multi-link TWT agreement between an AP MLD and a non-AP MLD. Also, the above subfield may be used for a station affiliated with a non-AP MLD and an AP affiliated with a AP MLD for each link. In another related embodiment, one TWT Flow Identifier subfield (or Broadcast TWT ID subfield) is used for a multi-link TWT agreement that is set up on more than one link. In one embodiment, the TWT Flow Identifier subfield (or Broadcast TWT ID subfield) on a link is different from the TWT Flow Identifier subfield (or Broadcast TWT ID subfield) on another link.

In still other specific examples according to the present disclosure, embodiments involve the condition where a TWT Teardown frame is successfully transmitted or received on at least one of the links. Upon successful transmission or reception, the multi-link TWT agreement corresponding to the TWT Flow Identifier between the AP MLD and the non-AP MLD on all links is deleted.

In other specific examples according to the present disclosure, embodiments involve methods in which a multi-link TWT agreement is identified. In one embodiment, each multi-link TWT agreement is uniquely identified by a single identification (ID) for application across all the links that multi-link TWT is setup, and a single MAC address of a MLD that represents all the STAs affiliated with the MLD for which the multi-link TWT is setup. In one set of example implementations of this type, specific embodiments involve a method in which data defining a broadcast multi-link TWT operation may include a broadcast TWT ID, a MAC address of TWT scheduling AP MLD tuple. In this example implementation, the broadcast TWT ID value may be the same for all the links for which the broadcast multi-link TWT operates, and in other related example implementations related methodology includes using data defining an individual multi-link TWT operation that may include, for example, a TWT flow identifier, a MAC address of TWT requesting STA MLD, a MAC address of TWT responding STA MLD triple. In examples involving the broadcast multi-link TWT operation and the individual multi-link TWT, one MAC address may be used to represent each MLD (it may be any of TWT scheduling AP MLD, TWT requesting STA MLD, TWT responding STA MLD). In one such related example implementation, the MAC address of an MLD is an MLD MAC address of the MLD, and in another, the MAC address of the MLD is a MAC address associated with the MAC data service interfaces of the MLD. In another such related example implementation, the MAC address of the MLD is a MAC address of a STA affiliated with the MLD on a link for which the multi-link TWT agreement is made, and in another, the MAC address of the MLD is a MAC address of a specific STA affiliated with the MLD such as a STA in the lowest link ID within all links, or the highest link ID within all links, or a STA in a predefined group of links.

In one specific example embodiment for an individual multi-link TWT, the TWT flow identifier may indicate that the TWT agreement identified by the flow identifier is a multi-link TWT. For example, the TWT flow identifier comprises a first subfield that is set to a value indicating that current TWT flow identifier is for multi-link operation.

According to another aspect, the present disclosure involves a method for a first multi-link device (MLD) to setup a TWT agreement with a second MLD on a set of links. The method may include three steps, the first of which may be a transmission by the first MLD to the second MLD. This transmission may consist of a request frame that includes a subfield indicating that a TWT agreement is being requested. The second step may be a receiving step where the first MLD receives a response frame from the second MLD. This response may indicate acceptance of the first MLD's TWT agreements request. The third step may include the first MLD identifying the TWT agreement uniquely. This involves identifying the first identifier, the MLD MAC address of the first MLD, and the MLD MAC address of the second MLD.

In still other specific example according to the present disclosure, embodiments involve the first response frame, of the previous example, further including information on the set of links.

In yet other specific example, the first identifier, of the previous example, may be a TWT flow identifier where the flow identifier may be defined for multi-link operation.

In one specific example the first response frame may include a second subfield indicating that the current TWT flow identifier is for multi-link operation.

In another specific example of the present disclosure, a first STA may be affiliated with a first MLD and a second STA may be affiliated with a second MLD. Also, a second TWT agreement may be set up between the first STA and the second STA with a first TWT Flow identifier on a first link that is within the set of links. If the first TWT Flow identifier is the same as the first identifier, then the first TWT agreement and the second TWT agreement may be uniquely identified.

According to another related example, the first MLD may be a TWT requesting STA MLD and the second MLD may be a TWT responding STA MLD.

In a specific example, the first MLD may be a non-AP MLD that made a multi-link setup with an AP MLD, and the second MLD may be the AP MLD.

In yet another specific example, the first TWT agreement identified by the first identifier may be applied for all the links within the set of links.

In other specific examples, the present disclosure concerns embodiments involving methods in which a multi-link TWT agreement is identified. In one such example embodiment, each multi-link TWT agreement is uniquely identified by a single identification (ID) for all the links for which multi-link TWT is setup and a set of MAC addresses of STAs for which the multi-link TWT is setup, wherein all the STAs are affiliated with the same MLD. For this type of example embodiment, a method may involve use of a set of data defining a broadcast multi-link TWT operation that may include, but not limited to, a broadcast TWT ID, a MAC address of TWT scheduling AP per-link tuples. This set of data may include or be composed of tuples of all links that are used to configure the broadcast multi-link TWT. In such an example implementation, a broadcast multi-link TWT is uniquely identified if a TWT is identified by any of the tuple in the set, and the broadcast TWT ID value may be the same for all the links for which the broadcast multi-link TWT operates. In other related example methods, a set of data may define an individual multi-link TWT operation with the data including, for example, a TWT flow identifier, a MAC address of TWT requesting STA, a MAC address of TWT responding STA per-link triples. Such a data set may include or be composed of triples of all links that are used to configure the individual multi-link TWT. In one such specific example implementation, the individual multi-link TWT is uniquely identified if a TWT is identified by any of the triple in the set, and the TWT flow identifier in each per-link triple may be the same in the set. In the examples of the broadcast multi-link TWT operation and the individual multi-link TWT operation, the MAC address of a STA that is affiliated with an MLD may be, for example, any of TWT scheduling AP MLD, TWT requesting STA MLD, TWT responding STA MLD; and on a different link the implementation may be different.

In other specific examples, the present disclosure concerns embodiments involving methods in which a multi-link TWT agreement is identified. In one such embodiment, each multi-link TWT agreement is uniquely identified by a set of identifications and MAC address of STAs for which the multi-link TWT is setup, wherein all the STAs are affiliated with the same MLD. In these examples, embodiments involve a method in which a set of data defining a broadcast multi-link TWT operation may include, but not limited to, a broadcast TWT ID, a MAC address of TWT scheduling AP per-link tuples. This set of data may include or be composed of tuples of all links that are used to configure the broadcast multi-link TWT. In these examples, a broadcast multi-link TWT may be uniquely identified if a TWT is identified by any of the tuple in the set. In this example implementation, the broadcast TWT ID value may be different for the different link for which the broadcast multi-link TWT operates. In this example, another embodiments involve a method in which a set of data defining an individual multi-link TWT operation may include, but not limited to, a TWT flow identifier, a MAC address of TWT requesting STA, a MAC address of TWT responding STA per-link triples. This set of data may include or be composed of triples of all links that are used to configure the individual multi-link TWT. In such example implementations, the individual multi-link TWT is uniquely identified if a TWT is identified by any of the triple in the set, and the TWT flow identifier in a different per-link triple may be different in the set. In the examples of the broadcast multi-link TWT operation and the individual multi-link TWT operation, the MAC address of a STA that is affiliated with an MLD which may be, for example, any of TWT scheduling AP MLD, TWT requesting STA MLD, TWT responding STA MLD; and on a different link the implementation may be different.

In other specific examples according to the present disclosure, embodiments involve a tearing down operation of a multi-link TWT. In one such example embodiment, for a TWT scheduling AP MLD that receives a TWT element on a link with the TWT Request field equal to 1, the Negotiation Type subfield equal to 3, the TWT Setup Command field set to Reject, and the Broadcast TWT ID corresponds to a multi-link broadcast TWT, the TWT scheduling AP MLD deletes the membership of a certain affiliated STA MLD; this affiliated STA MLD may be identified as the STA corresponding to the TA of the MMPDU that contained the TWT element schedule that has the Broadcast TWT ID value that is equal to the value of the Broadcast TWT ID field of the TWT element. In one specific example, a TWT scheduled STA MLD may terminate membership in all broadcast TWTs in all links by transmitting a TWT Teardown frame with the Teardown All TWT field set to 1.

In one specific embodiment related to the above examples, a STA affiliated with a non-AP MLD may tear down all individual TWT agreements in all links by sending a TWT Teardown frame with the Teardown All TWT field set to 1, and the Teardown frame may further include an indication (e.g., an all link subfield) that the teardown is for more than one link, for example, this link only or for all links. For example, if the Negotiation Type subfield is 0 or 1, a current Reserved bit in the TWT Flow field is reused as the indication. If such a bit is set to a state (e.g., 1), the teardown is for all links. Otherwise, the teardown is for this link only. In another related example embodiment, a STA affiliated with a non-AP MLD may tear down all individual TWT agreements in all links by sending a TWT Teardown frame with the Teardown All TWT field set to 1 and All Link subfield set to 1.

Certain other specific examples according to the present disclosure are directed to a triggered-enabled TWT issue. In conventional TWT protocol, the TWT responding STA of a trigger-enabled TWT agreement shall schedule for transmission a Trigger frame for the TWT requesting STA, within each TWT SP for that TWT agreement. However, when the TWT agreement is setup on more than one link, the conventional TWT protocol does not define on which link the TWT responding STA MLD needs to schedule for transmission a Trigger frame for the TWT requesting STA MLD. To address such an issue in certain examples according to the present disclosure, embodiments may involve operation of a multi-link TWT that is a Trigger-enabled TWT. In one embodiment, when an individual TWT agreement is setup on more than one link between a TWT requesting STA MLD and a TWT responding STA MLD, wherein the individual TWT agreement is a trigger-enabled TWT agreement, the TWT responding STA MLD of the trigger-enabled TWT agreement schedules for transmission of Trigger frames for the TWT requesting STA MLD on all the setup links, within each TWT SP for that TWT agreement. In one embodiment, the TWT requesting STA MLD further transmit a Trigger Based PPDU (Physical-layer Protocol Data. Unit) in response to the reception of the Trigger frame, wherein the Trigger Based PPDU includes information on other links such as Active/Doze state indication, buffer status, bandwidth query.

In another related example embodiment, when an individual TWT agreement is setup on more than one link between a TWT requesting STA MLD and a TWT responding STA MLD, wherein the individual TWT agreement is a trigger-enabled TWT agreement, the TWT responding STA MLD of the trigger-enabled TWT agreement schedules for transmission of Trigger frames for the TWT requesting STA MLD on at least one link among the setup links, within each TWT SP for that TWT agreement.

In another embodiment, when an individual TWT agreement is setup on more than one link between a TWT requesting STA MLD and a TWT responding STA MLD, wherein the individual TWT agreement is a trigger-enabled TWT agreement, the TWT responding STA MLD of the trigger-enabled TWT agreement schedules for transmission of Trigger frames for the TWT requesting STA MLD on a predetermined link, within each TWT SP for that TWT agreement. In one embodiment, the predetermined link is preset when the individual TWT agreement is setup. In one embodiment, the predetermined link is a link that the TWT responding STA MLD transmitted a TWT element with TWT Setup Command field is set to Accept TWT.

In another embodiment, when an individual TWT agreement is setup on more than one link between a TWT requesting STA MLD and a TWT responding STA MLD, wherein the individual TWT agreement is a trigger-enabled TWT agreement, the TWT responding STA MLD cancels the transmission of a scheduled Trigger frame on a link if the TWT requesting STA MLD has already transmitted using another link information on the link during the TWT SP, wherein the information on the link may be carried by a PS-Poll frame, U-APSD trigger frame, Buffer status report for the link, Bandwidth query report for the link.

In another embodiment, when an individual TWT agreement is setup on more than one link between a TWT requesting STA MLD and a TWT responding STA MLD, wherein the individual TWT agreement is a trigger-enabled TWT agreement, the TWT responding STA MLD cancels the transmission of a scheduled Trigger frame on a link if the TWT responding STA MLD has already scheduled a Trigger frame for the TWT requesting STA MLD on another link. In one embodiment, the TWT requesting STA MLD further sends back a frame in response to the reception of the Trigger frame. In this embodiment, the frame may include information on the link.

Other related aspects according to the present disclosure may be used to address issues involved with conventional TWT protocol, in which the TWT responding STA can deliver the buffered Bufferable Units (BU) in Aggregated MAC Protocol Data Unit (A-MPDU) sent under a block ACK (or acknowledge) agreement if the TWT is an announced TWT and the TWT requesting STA is awake for that TWT SP, or if the TWT is an unannounced TWT, wherein the TWT requesting STA is assumed to already be awake at the start of the unannounced TWT SP. However, when an individual TWT agreement is setup on more than one link between a TWT requesting STA MLD and a TWT responding STA MLD, and when the individual TWT agreement is an unannounced TWT, the conventional TWT protocol does not define on which link the TWT responding STA MLD needs to be awake at the start of the TWT SP.

In other specific examples according to the present disclosure, embodiments involve operation of a multi-link TWT that is an unannounced TWT. In one embodiment, when an individual TWT agreement is setup on more than one link between a TWT requesting STA MLD and a TWT responding STA MLD, wherein the individual TWT agreement is an unannounced TWT, the TWT requesting STA MLD of the unannounced TWT is in awake state on all the setup links, at the start of each TWT SP for that TWT agreement.

In another embodiment, when an individual TWT agreement is setup on more than one link between a TWT requesting STA MLD and a TWT responding STA MLD, wherein the individual TWT agreement is an unannounced TWT, the TWT requesting STA MLD of the unannounced TWT is in awake state on at least one link among the setup links, at the start of each TWT SP for that TWT agreement.

In another embodiment, when an individual TWT agreement is setup on more than one link between a TWT requesting STA MLD and a TWT responding STA MLD, wherein the individual TWT agreement is an unannounced TWT, the TWT requesting STA MLD of the unannounced TWT is in awake state on a predetermined link, at the start of each TWT SP for that TWT agreement. In one embodiment, the predetermined link is preset when the individual TWT agreement is setup. In one embodiment, the predetermined link is a link that the TWT responding STA MLD transmitted a TWT element with TWT Setup Command field is set to Accept TWT.

In yet other related examples, the present disclosure is directed to methodology that may involve switching from per-link TWT to per-MLD TWT. In conventional TWT protocol, a TWT requesting STA is allowed to renegotiate the TWT parameters of an existing TWT agreement by sending to the TWT responding STA a TWT request with a Flow Identifier that corresponds to that TWT agreement. The TWT response sent by the TWT responding STA containing the TWT Setup Command field of Accept TWT will indicate whether the newly requested TWT parameters are accepted or whether the previously negotiated TWT parameters are still in place. However, when an individual TWT agreement is setup between a TWT requesting STA MLD and a TWT responding STA MLD, conventional TWT protocol does not allow switching the status of the individual TWT agreement between a per-link TWT agreement and a per-MLD TWT agreement.

In other specific examples according to the present disclosure, embodiments involve switching from per-link TWT agreement to per-MLD TWT agreement. In one embodiment, when a first STA is affiliated with a first MLD and a second STA is affiliated with a second MLD, and a first individual TWT agreement is setup between the first STA and the second STA with a first TWT flow identifier, wherein the first STA is a TWT requesting STA and the second STA is a TWT responding STA, if the second MLD sends a TWT response to the first MLD, wherein the TWT response includes an indication that a second individual TWT agreement for a multi-link operation is accepted, and wherein the second individual TWT agreement is identified by the first TWT flow identifier, the first individual TWT agreement that is identified by <the first TWT flow identifier, MAC address of the first STA, MAC address of the second STA> triple is modified to the second individual TWT agreement that is identified by <the first TWT flow identifier, MLD MAC address of the first MLD, MLD MAC address of the second MLD> triple. In one embodiment, The TWT response further comprises a TWT Setup Command field that is set to a value that indicates Accepted TWT. In another embodiment, after the TWT response, the first individual TWT agreement between the first STA and the second STA with the first TWT flow identifier is torn down. In another embodiment, the second MLD sends the TWT response in response to the reception of a TWT request from the first MLD. In another embodiment, the second STA of the second MLD sends the TWT response in response to the reception of a TWT request from the first STA of the first MLD. In another embodiment, a third STA that is affiliated with the second MLD sends the TWT response in response to the reception of a TWT request from a fourth STA that is affiliated with the first MLD, wherein the third STA and the second STA are operating on different link and wherein the third STA and the fourth STA are operating on the same link.

In other specific examples according to the present disclosure, embodiments involve modifying the links on which a multi-link TWT agreement is made. In one embodiment, TWT peer STA MLDs renegotiate the multi-link TWT agreement with the same information except the updated multi-link information. In this embodiment, a TWT element may be used for updating the multi-link TWT agreement between the TWT peer STA MLDs.

In one embodiment, a frame conveying the TWT information field includes multi-link information, wherein update of the multi-link information indicates that the multi-link configuration is updated. In this regard, in one embodiment a management frame including TWT Information field includes a MAC header, wherein at least one field of the MAC header indicates the links that the TWT agreement keeps going. In one embodiment, an A-Control field is present for the management frame, and the A-Control field includes a bitmap on which link(s) the TWT agreement keeps going. In one embodiment, one variant of an A-Control field may be defined to be used for multi-link indication. In one embodiment, if the on-going schedule for the next TWT SP is not to be updated, the Next TWT Request subfield is set to 1, and the Next TWT subfield value is set to the next expected TWT time.

In this regard, in one embodiment contents of the TWT Information field are modified to include the multi-link information. In one embodiment, the Next TWT subfield indicates both the multi-link information and the Next TWT time if the TWT identified by the TWT Flow Identifier between the AP MLLE and the non-AP MLLE is a multi-link TWT. For an example, K most-significant bits (or MSB, where K is a positive integer) of the Next TWT subfield represents a link-bitmap that indicates the links on which the TWT agreement keeps going, and the rest of the Next TWT subfield bits indicates the next expected TWT time. In another embodiment, the Next TWT Request subfield in the TWT Information field is set to 0, and the Next TWT subfield is reused to indicate the multi-link information. For an example, if the Next TWT Request subfield is set to 0 and the Next TWT Subfield Size subfield is not set to zero, the Next TWT subfield represents a link-bitmap which indicates the links that the TWT agreement keeps going. For another example, if the Next TWT Request subfield is set to 0 and the Next TWT Subfield Size subfield is not set to zero, the Next TWT subfield represents a link-bitmap which indicates the links that the TWT agreement is suspended.

In other specific examples according to the present disclosure, embodiments involve switching from per-link TWT agreement to per-MLD TWT agreement. In one embodiment, when a first STA is affiliated with a first MLD and a second STA is affiliated with a second MLD, and a first individual TWT agreement is setup between the first STA and the second STA with a first TWT flow identifier, wherein the first STA is a TWT requesting STA and the second STA is a TWT responding STA, if the second MLD sends a TWT response to the first MLD, wherein the TWT response includes an indication that a second individual TWT agreement for a multi-link operation is accepted, and wherein the second individual TWT agreement is identified by the first TWT flow identifier, the first individual TWT agreement that is identified by <the first TWT flow identifier, MAC address of the first STA, MAC address of the second STA> triple is modified to the second individual TWT agreement that is identified by <the first TWT flow identifier, MLD MAC address of the first MLD, MLD MAC address of the second MLD> triple. In one embodiment, the TWT response further comprises a TWT Setup Command field that is set to a value that indicates Accepted TWT. In another embodiment, after the TWT response, the first individual TWT agreement between the first STA and the second STA with the first TWT flow identifier is torn down. In another embodiment, the second MLD sends the TWT response in response to the reception of a TWT request from the first MLD. In another embodiment, the second STA of the second MLD sends the TWT response in response to the reception of a TWT request from the first STA of the first MLD. In another embodiment, a third STA that is affiliated with the second MLD sends the TWT response in response to the reception of a TWT request from a fourth STA that is affiliated with the first MLD, wherein the third STA and the second STA are operating on different link and wherein the third STA and the fourth STA are operating on the same link.

In other specific examples according to the present disclosure concern issues and embodiments involving explicit indication of link suspension and resumption. In conventional TWT protocol, TWT Information frame is used to temporarily suspend and/or resume a TWT agreement. However, conventional TWT protocol does not allow to temporarily suspend and/or resume an individual TWT agreement on a specific set of links only if the individual TWT agreement includes more than one link.

In other specific examples according to the present disclosure, embodiments involve explicit indication of link suspension and resumption. In one embodiment, when a first MLD sends a TWT Information frame to a second MLD, the TWT Information frame includes information on a first set of links to indicate that information on a TSF value at the next TWT for a TWT specified by a first TWT Flow Identifier subfield included in the TWT Information frame is applied to, if the TWT specified by the first TWT Flow Identifier is agreed on more than one link (or for multi-link operation).

In one embodiment, if the first TWT Flow Identifier corresponds to an TWT agreement for multi-link operation, a TWT Information field included in the TWT Information frame includes a first subfield, wherein the first subfield indicates the first set of links that information of the TSF value is applied to. In one example, the first subfield may include or be composed of a first bitmap, wherein each bit in the first bitmap indicates if the information of the TSF value is applied to a corresponding link within a second set of links, and wherein the TWT specified by the first TWT Flow Identifier between the first MLD and the second MLD is agreed on the second set of links.

In another embodiment, if the first TWT Flow Identifier corresponds to an TWT agreement for multi-link operation and the first MLD receives a valid acknowledgement frame to the TWT Information frame, ongoing TWT is suspended until the time in accordance with the information on the TSF value on the first set of links. In one example, current TWT schedule is maintained on links that is not included in the first set of links among the links that TWT agreement is setup by the first TWT Flow Identifier.

In another embodiment, if the first TWT Flow Identifier corresponds to an TWT agreement for multi-link operation and the first MLD receives a valid acknowledgement frame to the TWT Information frame, ongoing TWT is suspended on the first set of links if the information on the TSF value is not included in the TWT Information frame. In one example, current TWT schedule is maintained on links that is not included in the first set of links among the links that TWT agreement is setup by the first TWT Flow Identifier.

In another embodiment, if the first TWT Flow Identifier corresponds to an TWT agreement for multi-link operation and the first MLD receives a valid acknowledgement frame to the TWT Information frame, the information on the TSF value indicates the earliest TWT at which the TWT schedule on the first set of links specified by the first TWT Flow Identifier is resumed. In one example, current TWT schedule is maintained on links that is not included in the first set of links among the links that TWT agreement is setup by the first TWT Flow Identifier.

In other specific examples according to the present disclosure, embodiments involve implicit indication of link suspension and resumption. In one such example embodiment, when a first STA is affiliated with a first MLD and a second STA is affiliated with a second MLD, and a first individual TWT agreement is setup between the first MLD and the second MLD with a first TWT flow identifier on a first set of links, when the first STA sends a TWT Information frame to the second STA on a first link, wherein the first link is included in the first set of links and wherein the TWT Information frame includes the first TWT flow identifier, the contents of the TWT Information frame is applied to the TWT identified by the first TWT flow identifier on the first link.

In another or a related example, a TWT Information field included in the TWT Information frame may further include information on a TSF value at the next TWT for the first individual TWT. In one such embodiment, if the first STA receives a valid acknowledgement frame to the TWT Information frame on the first link, TWT is suspended until the time in accordance with the information on the TSF value on the first link. In this embodiment, current TWT schedule may be maintained on links that is not the first link in the first set of links, and in another embodiment, if the first STA receives a valid acknowledgement frame to the TWT Information frame on the first link, the information on the TSF value indicates the earliest TWT at which the TWT schedule of the first TWT agreement on the first link is resumed. In this latter embodiment, a current TWT schedule may be maintained on links that is not the first link in the first set of links. In another embodiment, if the first STA receives a valid acknowledgement frame to the TWT Information frame on the first link, ongoing TWT is suspended on the first link if the TWT Information frame does not include the information on the TSF value. In this embodiment, current TWT schedule may be maintained on links that is not the first link in the first set of links.

The skilled artisan would recognize that various terminology as used in the Specification (including claims) uses language on the context of the art unless otherwise indicated. As examples, the Specification describes and/or illustrates aspects useful for implementing the aspects of the present disclosure by way of operations by various circuits or circuitry which may not have been expressly illustrated but understood as being present (e.g., a data router, modem, CPU, and/or other types of data routing devices). Such circuits or circuitry are used together with other elements to exemplify how certain embodiments may be carried out in the form or system-level structures, steps, functions, operations, activities, etc. For example, in certain of the above-discussed embodiments, one or more of the aspects involved are implemented using programmable logic circuitry configured for implementing these operations/activities, as may be carried out in the approaches as shown and discussed above. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described as implemented with the actions associated with the above-described example embodiments of the present disclosure and used by such programmable circuitry to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure. Further, based upon the above discussion and illustrations, those skilled in the art would readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims

What is claimed is:

1. In a system using wireless communication in accordance with specifications for local area network (LAN) protocols and for media access control (MAC) and physical layer (PHY) protocols used for implementing wireless local area network (WLAN) Wi-Fi computer communication in frequency bands of multiple Gigahertz, a method comprising:
   negotiating a target wake time (TWT) agreement by using or carrying information on which links the TWT agreement is to be set up via the carried information in a frame for the negotiation of the TWT agreement, wherein the TWT agreement has an individual TWT parameter set information field which includes a link bitmap to indicate to which links between devices of a first multi-link device (MLD) and devices of a second MLD the TWT agreement is applied, and each MLD comprising a plurality of non-access point (AP) devices or AP devices coupled to a respective link.

2. The method of claim 1, wherein a management frame for the TWT, for control processing involving at least one of setup, teardown, suspend and resume, includes an MLD MAC header of an MLD, and wherein at least one field of the MAC header indicates the link or links to which the TWT negotiation is applied.

3. The method of claim 2, wherein the system is to comply with IEEE 802.11 wireless communication systems, and wherein a control field, associated with the management frame and identifiable as A-control field, includes link information indicating to which link or links the TWT agreement is applicable.

4. The method of claim 1, wherein the negotiation includes using a TWT element format, having a TWT element, to include a multi-link indication.

5. The method of claim 4, further including, as part of the negotiating, providing a modified TWT element format to include a multi-link indication.

6. The method of claim 4, further including providing a modified TWT element format to include a multi-link indication, and wherein a broadcast TWT parameter set information field with a link bitmap is used to indicate to which link or links the TWT agreement may be applied.

7. The method of claim 4, wherein a multi-link TWT agreement is made based on the carried information, and a set of parameters shown in the TWT element are also applied to each link that is indicated in the carried information.

8. The method of claim 4, further including providing information associated with: a calculated TWT; a timing synchronization function (TSF) of an access point (AP) associated with an AP multi-link device (MLD) of the link to which the TWT element is conveyed, and applying the information to each of the links.

9. The method of claim 1, further including successfully communicating a TWT teardown frame, as transmitted or received on at least one of the links, and wherein the multi-link TWT agreement corresponding to a TWT flow identifier, between an access point multi-link device ("AP MLD") and a non-AP MLD, on each of the links is deleted.

10. The method of claim 1, further including, for a broadcast multi-link TWT, using data defining a multi-link TWT agreement, with such data including a tuple of a broadcast TWT identification and a MAC address of a TWT scheduling AP MLD, and wherein a TWT operation on each link within the multi-link TWT agreement is identified by the tuple.

11. The method of claim 10, wherein the MAC address of the TWT scheduling AP MLD is a MLD MAC address of the TWT scheduling AP MLD.

12. The method of claim 1, further including using, for individual multi-link TWT, a set of data defining a multi-link TWT operation, with such data including a TWT flow identifier, and a MAC address of a TWT requesting station, and scheduling access point per-link triples via a set of triples corresponding to all links that are used for the multi-link TWT agreement.

13. The method of claim 12, further including uniquely identifying an individual multi-link TWT if a TWT is identified by any triple in the set.

14. A method for a first MLD (multi-link device) to setup a first TWT agreement with a second MLD on a set of links, the method comprising:
  transmitting, by the first MLD, a first request frame to the second MLD, wherein the first request frame includes a first subfield set to a value indicating that the first frame requests a first TWT agreement;
  receiving, by the first MLD, a first response frame from the second MLD, wherein the first response frame includes the first subfield set to a value indicating that the first TWT agreement as requested is accepted and includes a first identifier to identify the first TWT agreement; and
  identifying, by the first MLD, the first TWT agreement uniquely by the first identifier, a MLD MAC address of the first MLD, and MLD MAC address of the second MLD, wherein the first TWT agreement has an individual TWT parameter set information field which includes a link bitmap to indicate to which links between devices of the first multi-link device (MLD) and devices of the second MLD the TWT agreement is applied, and each MLD comprising a plurality of non-access point (AP) devices or AP devices coupled to a respective link.

15. The method of claim 14, wherein the first response frame further comprises information on the set of links.

16. The method of claim 14, wherein the first identifier is a TWT Flow identifier defined for multi-link operation.

17. The method of claim 14, wherein the first response frame includes a second subfield indicating that a current TWT flow identifier is for multi-link operation.

18. The method of claim 14, wherein a first station is affiliated with the first MLD and a second station is affiliated with the second MLD, and a second TWT agreement is setup between the first station and the second station with a first TWT Flow identifier on a first link that is within a set of the links, wherein the first TWT Flow identifier is the same with the first identifier, and the first TWT agreement and the second TWT agreement are uniquely identified.

19. The method of claim 14, wherein the first MLD is a TWT requesting station MLD and the second MLD is a TWT responding station MLD.

20. The method of claim 14, wherein the first MLD is a non-AP MLD that caused a multi-link setup with an AP MLD, and wherein the second MLD is the AP MLD.

21. The method of claim 14, wherein the first TWT agreement as identified by the first identifier is applied for all the links within the set of links.

* * * * *